US009652318B2

(12) United States Patent
Namkoong et al.

(10) Patent No.: US 9,652,318 B2
(45) Date of Patent: May 16, 2017

(54) SYSTEM AND METHOD FOR AUTOMATICALLY MANAGING FAULT EVENTS OF DATA CENTER

(71) Applicant: Samsung SDS Co., Ltd., Seoul (KR)

(72) Inventors: Younghwan Namkoong, Seoul (KR); Jaeyoung Lee, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 159 days.

(21) Appl. No.: 14/528,019

(22) Filed: Oct. 30, 2014

(65) Prior Publication Data

US 2015/0121136 A1    Apr. 30, 2015

(30) Foreign Application Priority Data

Oct. 30, 2013  (KR) ........................ 10-2013-0130234

(51) Int. Cl.
  G06F 11/00 (2006.01)
  G06F 11/07 (2006.01)
(52) U.S. Cl.
  CPC ...... *G06F 11/0793* (2013.01); *G06F 11/0706* (2013.01); *G06F 11/079* (2013.01)
(58) Field of Classification Search
  CPC ............. G06F 11/0706; G06F 11/0775; G06F 11/079; G06F 11/0793
  See application file for complete search history.

(56) References Cited

U.S. PATENT DOCUMENTS 7,502,971 B2 * 3/2009 Cohen ................... G06F 11/008
  702/186

8,423,638 B2 * 4/2013 Moehler ............. G06F 11/0775
  709/223

(Continued)

FOREIGN PATENT DOCUMENTS

CN       101833497 B      1/2015
JP       2008-210148 A    9/2008
(Continued)

OTHER PUBLICATIONS

Communication dated Feb. 16, 2017, issued by the State Intellectual Property Office of P.R. China in counterpart Chinese Application No. 201410598452.4.

*Primary Examiner* — Joseph Kudirka
(74) *Attorney, Agent, or Firm* — Sughrue Mion, PLLC (57) ABSTRACT

Disclosed are an automated management system and method for fault events of a data center. A fault event monitoring unit is configured to check statuses of servers to detect occurrence of a fault event, and if a fault event occurs, determine whether an automated action is possible. A fault event related action recommending unit is configured to, with respect to a fault event that is newly detected by the fault event monitoring unit or determined to be difficult to be resolved by an action stored in a fault event related action storage unit, search for and extract information related to the fault event determined to be difficult to be resolved from information accumulated in a fault event information knowledge storage unit, and based on the extracted information, generate and output a group of automated action candidates for the fault event determined to be difficult to be resolved. A fault event action unit is configured to automatically take an action against a fault event detected by the fault event monitoring unit by use of the action accumulated in the fault event related action storage.

9 Claims, 9 Drawing Sheets

(56) References Cited

U.S. PATENT DOCUMENTS

2006/0174167 A1* 8/2006 Ito ..................... G06F 11/0727
  714/48
2012/0266020 A1* 10/2012 Souvannarath ..... G06F 11/0709
  714/26
2013/0073913 A1   3/2013 Neuhaus et al.

FOREIGN PATENT DOCUMENTS

| KR | 10-2008-0097254 A | 11/2008 |
|----|-------------------|---------|
| KR | 10-2010-0133168 A | 12/2010 |
| KR | 10-2011-0135632 A | 12/2011 |

* cited by examiner

"POSSIBLE BREAK-IN ATTEMPT!"
in /var/log/secure http://serverfault.com/
http://nixcraft.com/centos-rhel-fedora/...
http://www.eflo.net/VICIDIALforum/viewtopic.php?...

- ◆ Meaning of "POSSIBLE BREAK-IN ATTEMPT"
- ◆ The reason of this kind of event
- ◆ How to solve this problem ?

- reverse mapping checking getaddrinfo for ___ failed – POSSIBLE BREAK-IN ATTEMPT!
- in /var/log/secure
- Failed password for root from ___ port ___ ssh
- Input_userauth_request : invalid user test
- Received disconnect from ___
- CentOS 5.x running on a VPS platform

FIG.7

SYSTEM AND METHOD FOR AUTOMATICALLY MANAGING FAULT EVENTS OF DATA CENTER

CROSS REFERENCE TO RELATED APPLICATION

This application claims priority to and the benefit of Korean Patent Application No. 10-2013-0130234, filed on Oct. 30, 2013, the disclosure of which is incorporated herein by reference in its entirety.

BACKGROUND

1. Field of the Invention

An exemplary embodiment relates to an automated management system and method for fault events of a data center, and more particularly, to a system for automatically managing a fault event occurring in a data center and a method thereof.

2. Discussion of Related Art

With development of the cloud environment in recent years, an effective operation and management of a data center has been emerging as an important issue. Most conventional methods of managing a data center depend on the previous operation record, and faults of the data center are manually managed. In this case, the prediction of occurrence of fault events and automated rapid response and action are impossible. In addition, it is also difficult to have a proactive measure and prediction on a new type of fault events that have not previously occurred.

Representative examples of the existing fault management system include a self monitoring analysis and reporting technology (S.M.A.R.T) suggested by IBM. S.M.A.R.T monitors an abnormal operation of a storage, and tracks the cause of occurred errors, and provides predictions on faults to occur in the future. In this case, predictive failure analysis (PFA) technology is used. PFA tracks an abnormal operation of equipment (including monitoring a normal operation) and relevant potential causes of errors that have occurred, by using machine learning and mathematical modeling based on the past data of disks.

S.M.A.R.T has the following drawbacks and limitations.

First, the subject to monitoring is limited to hard disk drivers. Accordingly, the monitoring is restricted by attributes of the hard disks, for example, read error rate and reallocated sectors count.

Second, even though a prediction model is produced using machine learning and mathematical modeling schemes based on various types of data generated from the hard disk, the prediction model is applied only to erroneous operation patterns that have been internally generated up to the present. Accordingly, S.M.A.R.T is configured to operate based on a threshold derived from the past performance record data. Meanwhile, it is reported that 50% of erroneous hard disk failures occur without an alarm notification on a system.

Third, S.M.A.R.T has a limitation in that a prediction and response are not made on a potential fault event, such as a system down that may occur due to a conflict between versions of software (for example, system software, and middleware application).

Fourth, message notifications by S.M.A.R.T in monitoring are provided in only two types ('Device is OK' or 'Drive is likely to fail soon').

Figure 1:
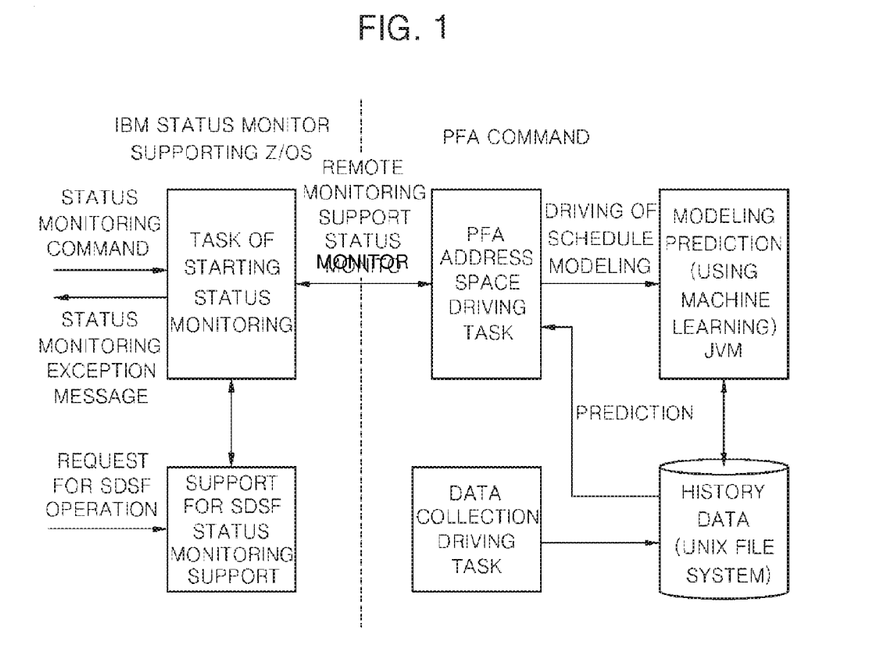
FIG. 1 is a view illustrating the entire configuration of PFA used in S.M.A.R.T.

FIG. 1 shows the entire configuration of PFA used in S.M.A.R.T.

The above described conventional technology adopts a scheme of performing monitoring with respect to internally generated data, based on an analysis model, obtained from machine learning and mathematical modeling, and a threshold regarded as a normal operation, thereby having a difficulty in predicting and responding to a fault event, such as a system error, that is internally unexpected. In addition, the conventional technology only has a certain device (e.g., hard disks) as subject to the monitoring, so it is impossible to offer responding plans to various types of fault events that may occur due to software being installed in a system and operated. In addition, the conventional technology is provided to mainly perform monitoring, which leads to a great number of erroneous detections of failures, causing a system operator to have unnecessary tasks.

SUMMARY OF THE INVENTION

One or more exemplary embodiments are directed to providing a system for predicting and responding to a fault event, such as a system error that is internally unexpected, through automated operation and management of a data center, and a method thereof.

One or more exemplary embodiments are also directed to providing a computer readable recording medium that records a program configured to execute a method for predicting and responding to a fault event, such as a system error that is internally unexpected, through automated operation and management of a data center.

According to an aspect of an exemplary embodiment, there is provided a system for automatically managing a fault event, the system including: a fault event analysis unit configured to analyze fault event related material stored in a fault event storage unit to generate summary information about each piece of the fault event related material, and analyze an association between each piece of the generated summary information about the fault event related material to generate responses corresponding to type-specific fault events; a fault event information knowledge storage unit configured to store fault event patterns generated by having the type-specific fault events associated with the responses corresponding to the respective type-specific fault events; a fault event related action storage unit configured to store actions verified with respect to fault events that have occurred; a fault event monitoring unit configured to check status of servers to detect occurrence of a fault event, and if a fault event occurs, determine whether an automated action is possible; a fault event related action recommending unit configured to, with respect to a fault event that is newly detected by the fault event monitoring unit or that is determined to be difficult to be resolved by an action stored in the fault event related action storage unit, search for and extract information related to the fault event determined to be difficult to be resolved from information accumulated in the fault event information knowledge storage unit, and based on the extracted information, generate and output a group of automated action candidates for the fault event determined to be difficult to be resolved; and a fault event action unit configured to automatically take an action against a fault event detected by the fault event monitoring unit by use of the action accumulated in the fault event related action storage unit. It is noted that one or more of the foregoing elements may be implemented via CPU or hardware processor.

According to another aspect of an exemplary embodiment, there is provided a fault event management method performed by a system for automatically managing a fault event of a data center, the fault event management method characterized by including the following steps: (a) analyzing fault event related material stored in a fault event storage unit to generate summary information about each piece of the fault event related material, and analyzing an association between each piece of the generated summary information about the fault event related material to generate responses corresponding to type-specific fault events; (b) storing fault event patterns generated by having the type-specific fault events associated with the responses corresponding to the respective type-specific fault events; (c) checking statuses of servers to detect occurrence of a fault event, and if a fault event occurs, determining whether an automated action is possible; (d) if a fault event is determined to be difficult to be resolved by an action stored in a fault event related action storage unit configured to store actions verified with respect to the fault events that have occurred, searching for and extracting information related to the fault event determined to be difficult to be resolved from information accumulated in a fault event information knowledge storage unit, and based on the extracted information, generating and outputting a group of automated action candidates for the fault event determined to be difficult to be resolved; and (e) automatically taking an action against a fault event that has occurred, by use of the action accumulated in the fault event related action storage

DETAILED DESCRIPTION OF EXEMPLARY EMBODIMENTS

Hereinafter, an automated management system and method for fault events of a data center according to embodiments of the inventive concept will be described in detail with reference to the accompanying drawings.

Figure 2:
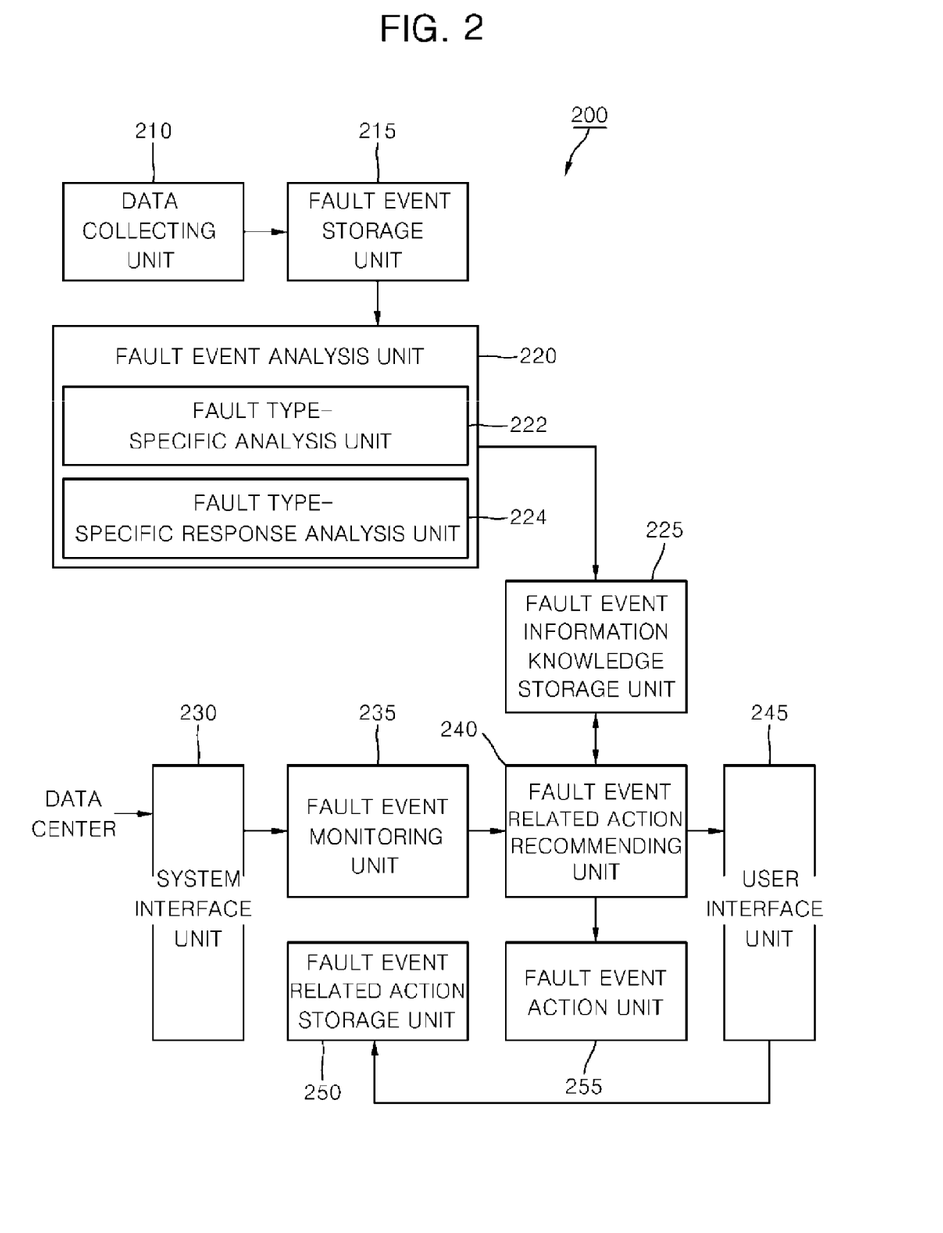
FIG. 2 is a block diagram illustrating a configuration of a system for automatically managing a fault event of a data center in accordance with an exemplary embodiment.

FIG. 2 is a view illustrating a configuration of a system for automatically managing a fault event of a data center in accordance with an exemplary embodiment.

Referring to FIG. 2, a system for automatically managing a fault event of a data center in accordance with an embodiment of the present invention includes a data collecting unit 210, a fault event storage unit 215, a fault event analysis unit 220, a fault event information knowledge storage unit 225, a system interface unit 230, a fault event monitoring unit 235, a fault event related action recommending unit 240, a user interface unit 245, a fault event related action storage unit 250, and a fault event action unit 255. The data collecting unit 210, the fault event storage unit 215 and the fault event monitoring unit 235 each may be provided as a separate module or system from the system for automatically managing a fault event of a data center according to the exemplary embodiment.

The data collecting unit 210 searches for and collects various types of fault event related material, such as material on system operation, discussion material, the result of a forum on hardware and software technology, and a service manual for technical support. The data collecting unit 210 may include a search module and a collecting module. The searching and collecting may be achieved by collecting raw data related to fault events using various types of on line data finders and aggregators, such as blog aggregators (for example, Blogdigger and the blogsphere), external search engines (for example, Google and Bing), and web crawlers. A site subject to the collection may be all types of sites including an online forum on a system error, a technical support site of a system development company, an online community for an operation system, and a site for providing articles on the latest trends of IT. In addition, contents to be collected may include information on all types of items of software and hardware that are installed and operated in a data center, for example, operating systems, applications, and Data Base Management System (DBMS). The material collected by the data collecting unit 210 is stored in the fault event storage unit 215. In this case, the fault event related raw data may be stored in a distribution file system. The raw data may be unstructured data including various types of data such as numbers, texts and images.

The fault event analysis unit 220 analyzes material stored in the fault event storage unit 215 to primarily extract basic information about each material, analyzes associations between each piece of the primarily extracted information generated from multiple materials to generate and arrange type-specific fault events based on the result of analysis of relevance, and generates a response and precautionary action corresponding to each type specific fault event. The generated response and precautionary action corresponding to the generated type specific fault event are stored as a pattern having a format [fault event, response] in the fault event information knowledge storage unit 225, and the patterns are accumulated and managed in the fault event information knowledge storage unit 225 through continuous collecting, analysis and generation processes. The patterns are used for a prompt action against a newly found fault event in the future. Information stored in the fault event information knowledge storage unit 225 is a result of a cause-occurrence association rule and analysis of a responding method. The fault event analysis unit 220 includes a fault type-specific analysis unit 222 and a fault type-specific response analysis unit 224.

Figure 3:
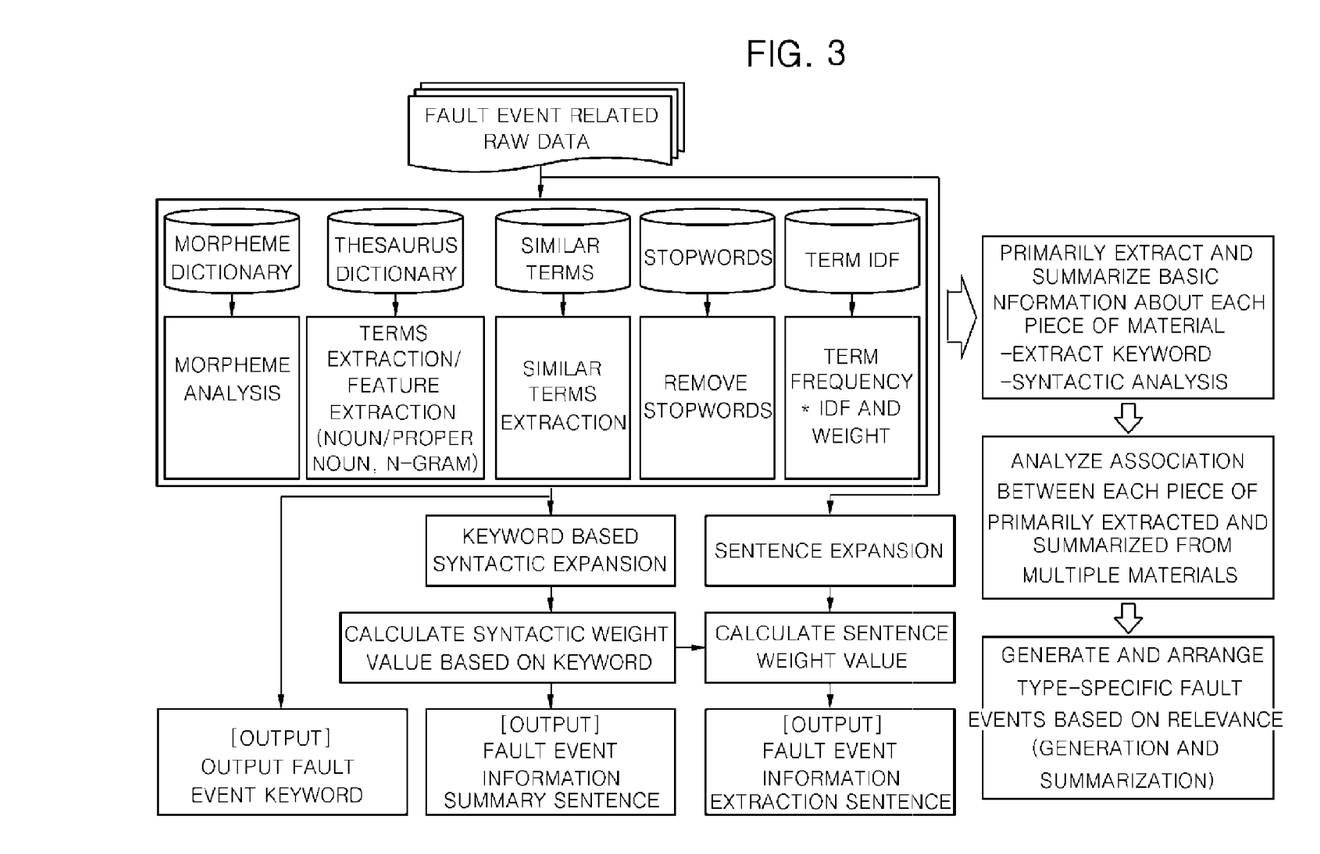
FIG. 3 is a view illustrating an operation of a fault type-specific analysis unit 222 generating type specific fault events from raw data.

The fault type-specific analysis unit 222 arranges, defines and summarizes fault events according to types by analyzing structured raw data and unstructured raw data that are stored in the fault event storage unit 215. FIG. 3 is a view illustrating an operation of a fault type-specific analysis unit 222 generating type-specific fault events from raw data for respective fault types. Referring to FIG. 3, with respect to raw data related to a fault event, the fault type-specific analysis unit 222 performs a morpheme analysis by referring to a morpheme dictionary, performs term extraction/characteristic extraction by referring to a thesaurus dictionary, extracts similar terms per terms by referring to a synonym dictionary, removes stopwords by referring to a stopwords dictionary, and performs a weighted calculation of (term frequency)*(inverse document frequency). The fault type-specific analysis unit 222 outputs a keyword of a fault event based on the result of such an analysis on the raw data, and outputs a fault event information summary sentence by performing a keyword based syntax extension and a keyword based syntax weight calculation with respect to the analysis result. In addition, the fault type-specific analysis unit 222 may output a fault event information extraction sentence by performing a sentence extraction and a sentence weight calculation with respect to raw data. In this case, the fault type-specific analysis unit 222 may refer to the keyword based syntax weight when calculating the sentence weight. Thereafter, the fault type-specific analysis unit 222 analyzes associations between respective pieces of primarily extracted summary information including the fault event keyword, the fault event information summary sentence and the fault event information extraction sentence that are output through the above process, to generate type-specific fault events based on relevance. In this case, the analysis of associations between the respective pieces of primarily extracted summary information may be performed in such a manner to aggregate and classify similar information by calculating a correlation. The correlation may be calculated by using various techniques related to clustering and classifying, for example, applying an Apriori algorithm and developing a frequent pattern tree. With respect to each intermediate result obtained in the above process, the fault type-specific analysis unit 222 generates statistical information about basic information summary, the type of occurrence of a fault and the equipment having a fault for each fault type.

Figure 4:
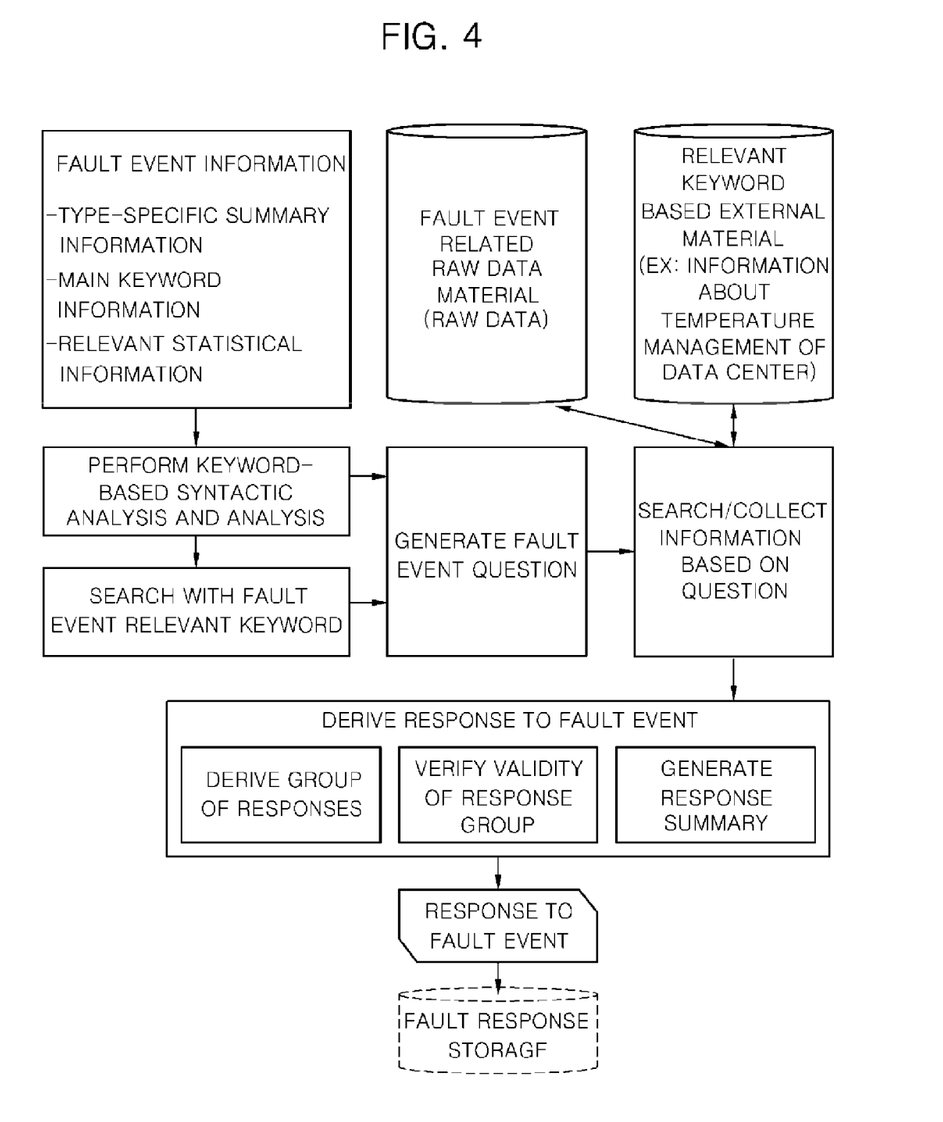
FIG. 4 is a view illustrating a process of a fault type-specific response analysis unit 224 generating responses according to fault types.

The fault type-specific response analysis unit 224 generates a response to a fault based on the summary information about the fault event information generated by the fault type-specific analysis unit 222. FIG. 4 is a view illustrating a process of a fault type-specific response analysis unit 224 generating responses for respective fault types. Referring to FIG. 4, the fault type-specific response analysis unit 224 reinterprets the fault event summary information generated by the fault type-specific analysis unit 222. To this end, the fault type-specific response analysis unit 224 performs a keyword syntactic analysis including a morpheme analysis, a spelling check, and normalization, and based on the result of the keyword syntactic analysis, converts the fault event information into various forms of questions in consideration of external influence factors on a fault event phenomenon. In this case, the fault event question is provided in the forms of when, where, how and why. Thereafter, the fault type-specific response analysis unit 224 acquires material for generating a response and action by applying an information search scheme to the interpreted fault event summary information in the form of a question. In this case, material subjected to the acquisition task represents all the material that may be collected from outside, including raw data previously collected. The fault type-specific response analysis unit 224 generates a solution by identifying the causal relation and associations based on the collected material. In this case, the fault type-specific response analysis unit 224 selects a group of solution candidates depending on a fault event question, and generates a possible solution by calculating a correlation between the solution candidates (for example, a dependency at each task), and the reliability and precision of the solutions. Thereafter, the fault type-specific response analysis unit 224 generates a [a fault event, a response] pattern by aggregating the generated fault event solutions, and stores the generated pattern in the fault event information knowledge storage unit 225.

The system interface unit 230 provides a data input/output path between the data center and the fault event monitoring unit 235.

The fault event monitoring unit 235 checks statuses of servers currently being operated, by use of the fault event pattern that is stored in the fault event information knowledge storage unit 225. The fault event monitoring unit 235 monitors current statuses of servers in real time, and determines a possibility of a fault to occur. If it is expected that a fault event has occurred, the fault event monitoring unit 235 selects and outputs a group of fault event candidates based on the current information. In addition, the fault event monitoring unit 235, upon occurrence of a fault event, determines whether it is possible to take an automated action, and performs a subsequent operation according to the determination. If the detected fault event is included in 'the accumulated material of previous automated actions' stored in the fault event related action storage unit 250, the fault event monitoring unit 235 instructs the fault event action unit 255 to take an automated action. On the contrary if the detected fault event is not included in 'the accumulated material of previous automated actions' stored in the fault event related action storage unit 250, the fault event monitoring unit 235 delivers relevant information to the fault event related action recommending unit 240 and instructs an action to be taken.

The fault event related action recommending unit 240, with respect to a fault event that is newly detected by the fault event monitoring unit 235 or determined to be difficult to be resolved by the existing automated action, searches for and extracts information related to the fault event from the information accumulated in the fault event information knowledge storage unit 225. Thereafter, the fault event related action recommending unit 240, based on the extracted information, generates a group of automated actions for the fault event, and outputs the group of automated actions to a system operator through the user interface unit 245. The system operator determines a response to the fault event, based on the group of automated actions that are output through the user interface unit 245, thereby resolving the fault event. In this case, the fault event related action recommending unit 240 may use algorithms that are generally known in the fields of artificial intelligence and machine learning, for example, a collaborative filtering recommendation system, an association rule mining scheme and a Bayesian scheme, to generate the group of automated action candidates.

An action that is verified after being taken on the fault event is stored in the fault event related action storage unit 250 such that the action is automatically executed at a later time with respect to a fault event of the same type.

The fault event action unit 255 automatically takes an action against a fault event detected by the fault event monitoring unit 235 by use of the actions accumulated in the fault event related action storage unit 250. In this case, results related to automated actions in the fault event related action storage unit 250 may be provided in various forms, such as by an automatic execution script and a patch program.

Figure 5A:
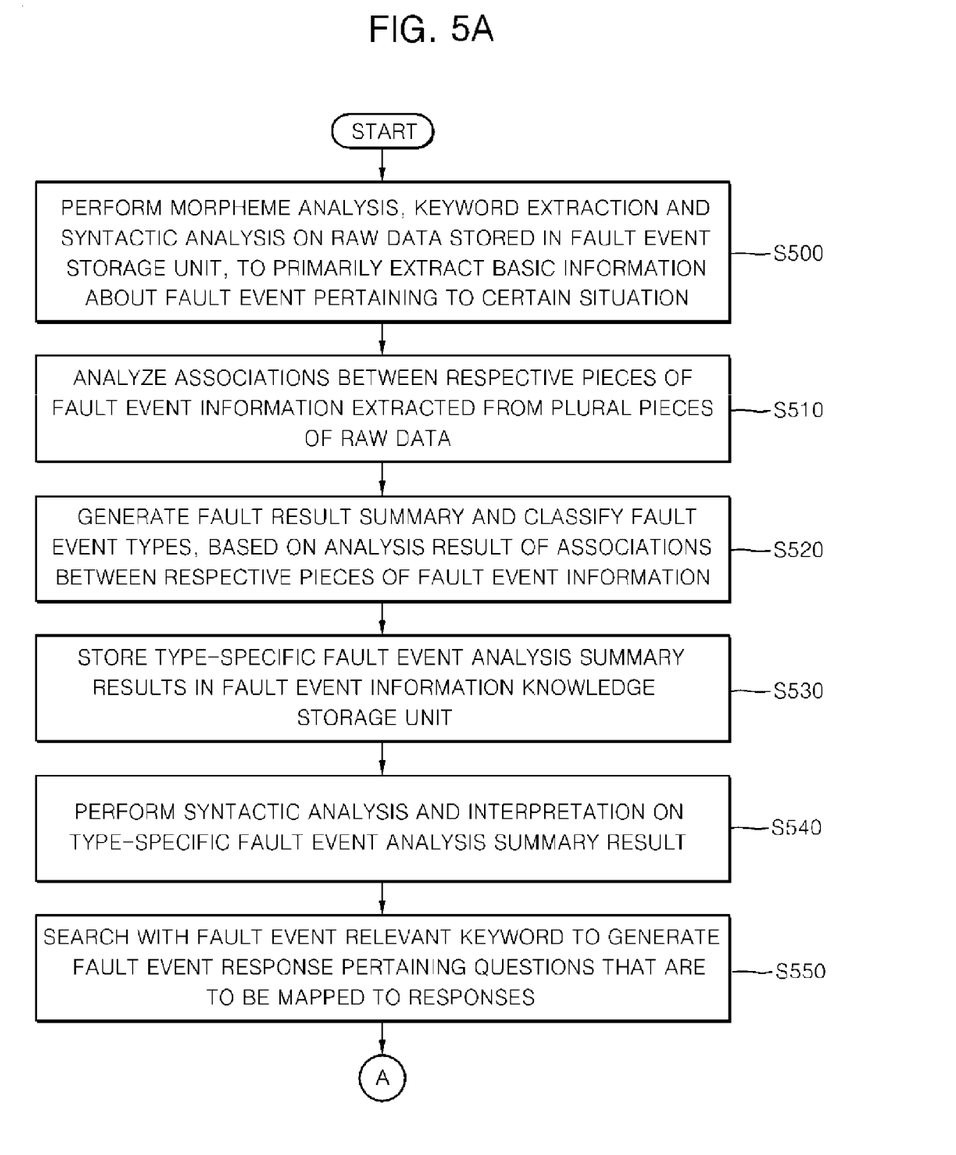
FIGS. 5A and 5B are flowcharts showing a process of a fault event analysis unit 220 performing a fault event analysis and deriving a response in accordance with an exemplary embodiment.
Figure 5B:
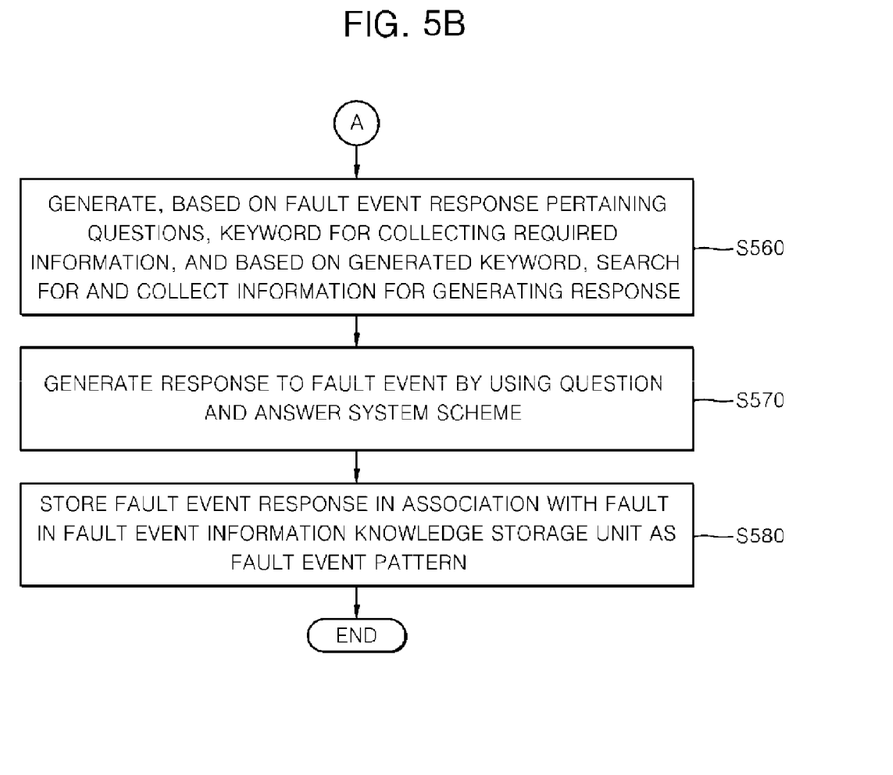

FIG. 5 is a flowchart showing a process of the fault event analysis unit 220 performing a fault event analysis and deriving a response in accordance with an exemplary embodiment.

Figure 6:
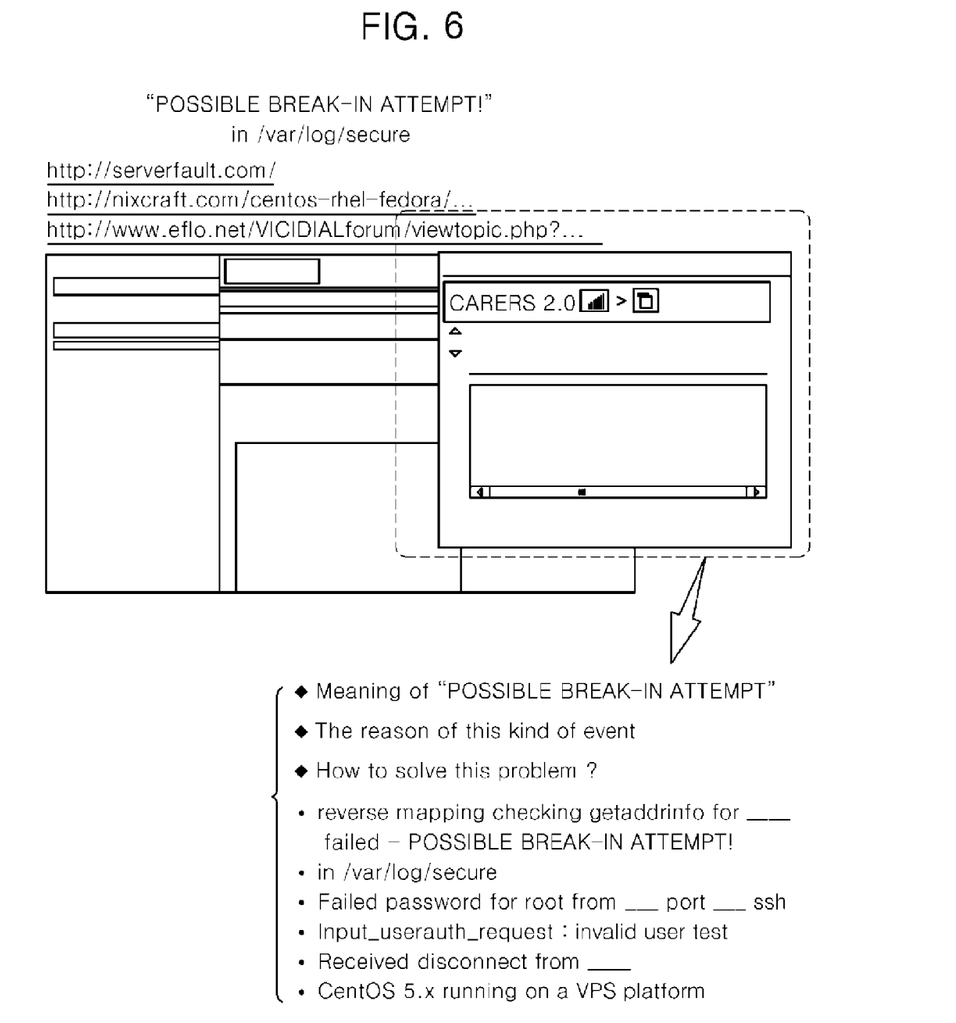
FIG. 6 is a view illustrating raw data and summary information extracted from raw data.

Referring to FIG. 5, the fault event analysis unit 220 performs a morpheme analysis, a keyword extraction and a syntactic analysis on raw data stored in the fault event storage unit 215 to primarily extract basic information about the fault event pertaining to a certain situation (S500). FIG. 6 is a view illustrating raw data and summary information primarily extracted from the raw data. Thereafter, the fault event analysis unit 220 analyzes associations between respective pieces of fault event information extracted from a plurality of pieces of raw data (S510). In this case, the associations are analyzed by aggregating results extracted from various pieces of raw data, and applying various types of association inference schemes, such as a statistical scheme including an association rule algorithm, and a logical inference. Thereafter, the fault event analysis unit 220 generates a fault result summary and classifies fault event types, based on the result of the analysis of associations between respective pieces of fault event information (S520). In this case, algorithms related to natural language processing and text summarization are used, and the generated summary results are classified into groups based on relevancy through a data classification scheme. The type-specific fault event analysis summary results obtained through the above processes are stored in the fault event information knowledge storage unit 225 (S530).

Figure 7:
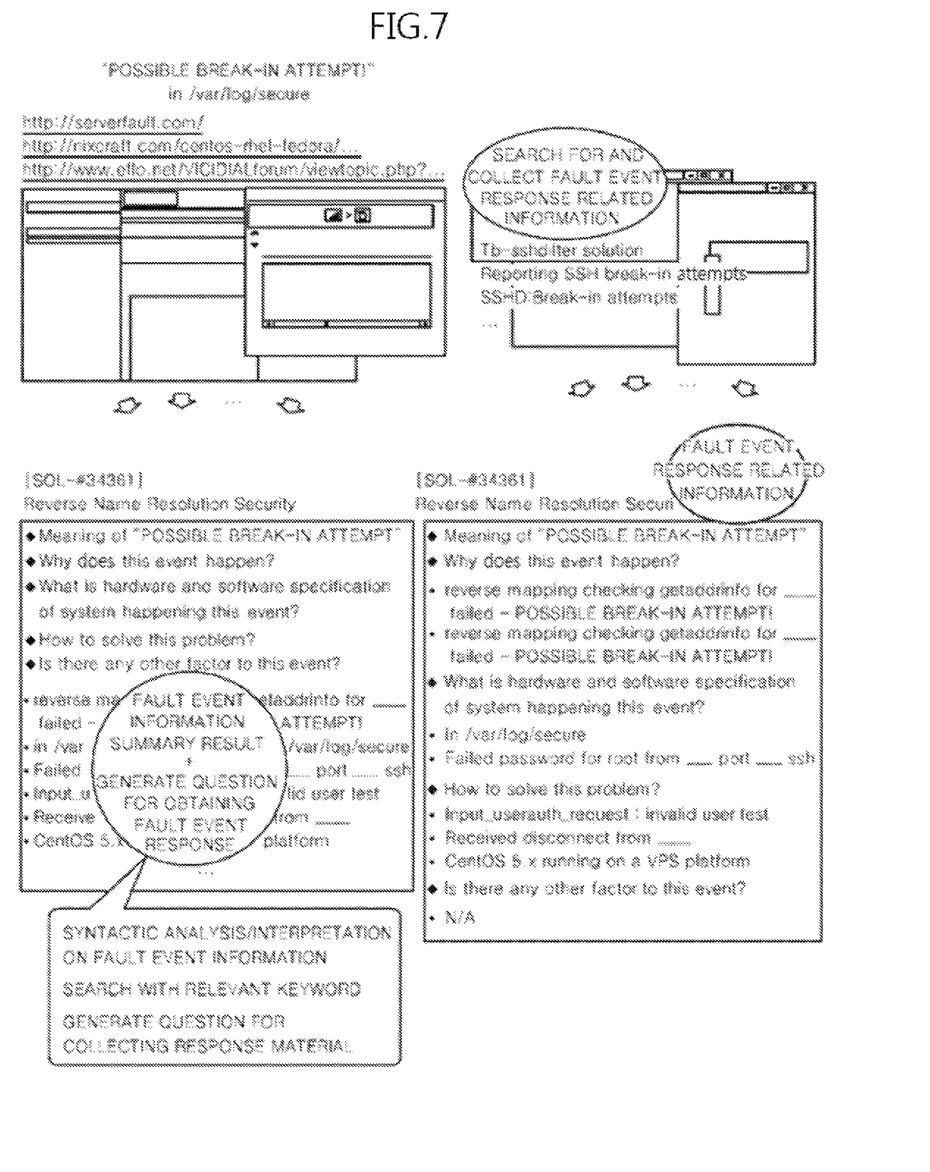
FIG. 7 is a view illustrating an example of generating a response to a fault event by using a fault event information summary result.

Thereafter, the fault event analysis unit 220 performs a syntactic analysis and interpretation of the type-specific fault event analysis summary result (S540), and based on the result of the syntactic analysis and interpretation, performs a search with a fault event relevant keyword to generate a fault event response pertaining question that may be mapped to a response (S550). Thereafter, the fault event analysis unit 220 generates, based on the fault event response pertaining question, a keyword for collecting required information, and based on the generated keyword, searches for and collects a plurality of pieces of information for generating a response (S560). In this case, other relevant information may be further collected through an online search, in addition to the materials that have been used to analyze the fault event analysis results according to types. Thereafter, the fault event analysis unit 220 generates a response to a fault event by using a question and answer system scheme (S570). The generated fault event response is associated with the corresponding fault event, and stored as a fault event pattern in the fault event information knowledge storage unit 225 (S580). FIG. 7 is a view illustrating an example of generating a response to a fault event by using a fault event information summary result.

Figure 8:
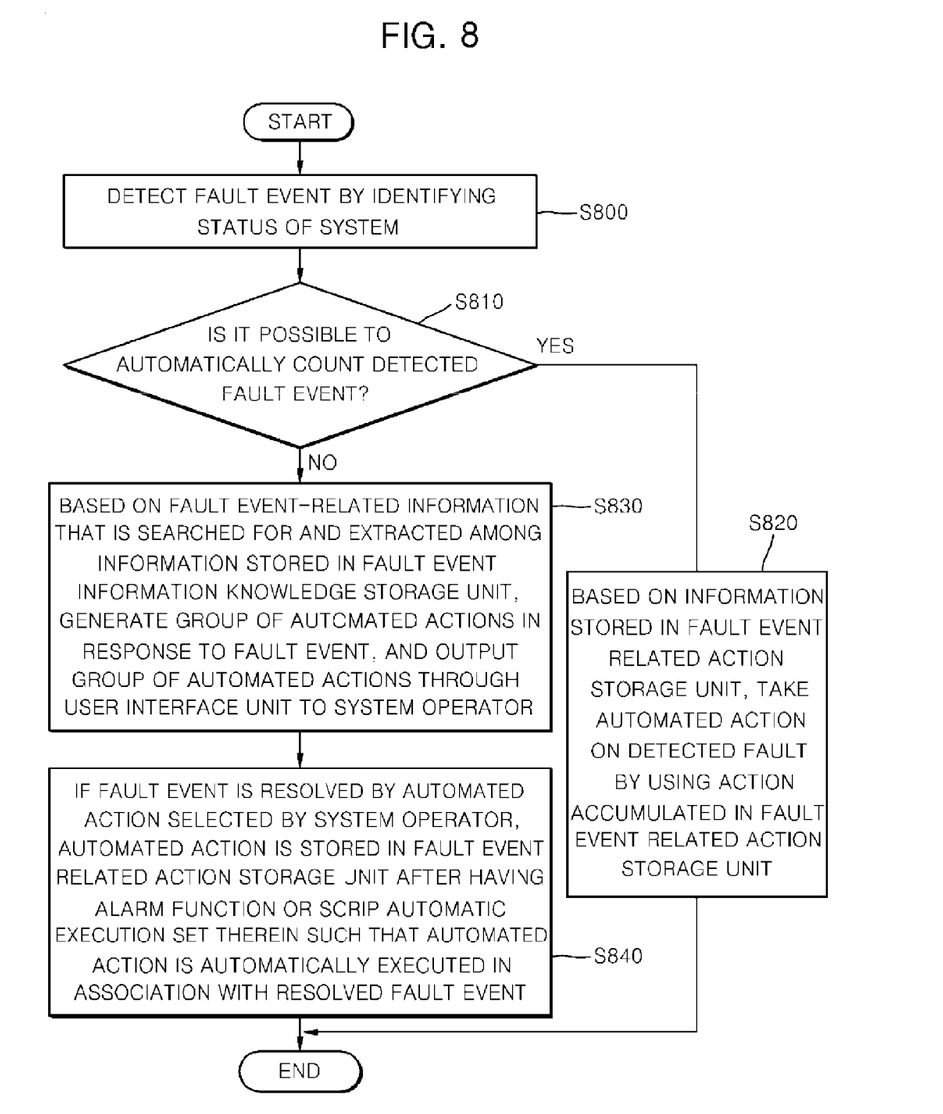
FIG. 8 is a flowchart showing execution of a method of automatically managing a fault event based on fault event information in accordance with fault event information.

FIG. 8 is a flowchart showing a method of automatically managing a fault event based on fault event information in accordance with fault event information.

Referring to FIG. 8, the fault event monitoring unit 235 detects a fault event by identifying a status of a system (S800). Thereafter, the fault event monitoring unit 235 determines, upon detecting a fault event, whether it is possible to automatically count the fault event based on information stored in the fault event related action storage unit 250 (S810). If it is determined to be possible to automatically count the fault event based on information stored in the fault event related action storage unit 250, the fault event action unit 255 automatically takes an action on the detected fault by use of the action accumulated in the fault event related action storage unit 250 (S820). On the contrary, if it is determined to be impossible to automatically count the fault event based on information stored in the fault event related action storage unit 250, the fault event related action recommending unit 240 searches for and extracts information related to the fault event among information stored in the fault event information knowledge storage unit 225, and based on the extracted information, generates a group of automated actions against the fault event, and outputs the group of automated actions through the user interface unit 245 to a system operator (S830). Thereafter, if the fault event is resolved by the automated action selected by the system operator, the automated action is stored in the fault event related action storage unit 250 after having an alarm function or a scrip automatic execution set therein such that the automated action is automatically executed in association with the resolved fault event (S840).

As described above, the system and method for automatically managing a fault event of a data center according to the exemplary embodiments can detect and count fault events that occur unexpectedly, such as a fault event having a possibility to occur at the time of executing a certain application and a system software related fault event, for example, a system down, by using fault event knowledge that is continuously accumulated. In addition, a fault event having a possibility to newly occur can be effectively blocked and a fault event that has occurred in the data center that is currently in operation can be responded to, based on the analysis result of fault event related external information that is continuously accumulated. In addition, the operation work load can be remarkably reduced by automatically processing the detected fault event, and the system stabilization can be achieved by performing continuous monitoring after performing a pre-detection and an automated action.

The exemplary embodiments of the inventive concept can be implemented as computer-readable codes in a computer-readable recording medium. The computer-readable recording medium includes all types of recording devices in which computer system-readable data are stored. Examples of the computer-readable recording medium include a ROM, a RAM, a CD-ROM, a magnetic tape, a floppy disk, and an optical data storage. Further, the recording medium may be implemented in the form of carrier waves such as used for Internet transmissions. In addition, the computer-readable recording medium may be distributed to computer systems over a network, in which computer-readable codes may be stored and executed in a distributed manner.

While the invention has been shown and described with reference to certain exemplary embodiments thereof, it will be understood by those of ordinary skill in the art that various changes in form and details may be made therein without departing from the spirit and scope of the invention as defined by the appended claims and their equivalents.

What is claimed is:

1. A system for automatically managing a fault event, the system comprising:
   a fault event analysis unit configured to analyze a piece of fault event related material to generate pieces of summary information about the piece of fault event related material, and to generate a response corresponding to a first fault event of a type according to an analysis of an association between the generated pieces of summary information;
   a first storage unit configured to store a fault event pattern generated by associating the first fault event of the type with the response;
   a second storage unit configured to store actions taken and verified with respect to the first fault event that has occurred;
   a fault event monitoring unit configured to check statuses of servers to detect occurrence of a second fault event, and if the second fault event occurs, to determine whether an automated action is possible;

a fault event related action recommending unit configured to search for and extract information related to the second fault event, which is newly detected by the fault event monitoring unit or determined difficult to be resolved by a first action stored in the second storage unit, from an information accumulated in the first storage unit, and to generate and output a group of automated action candidates for the second fault event; and a fault event action unit configured to automatically take a second action against a fault event detected by the fault event monitoring unit by use of the first action accumulated in the second storage unit, wherein the fault event analysis unit comprises:

a fault type-specific analysis unit configured to extract a fault event keyword and a fault event sentence with respect to raw data by performing the analysis comprising a morpheme analysis and a synonym analysis with respect to the raw data, and to generate the pieces of summary information based on the extracted fault event keyword and sentence; and by performing a keyword syntactic analysis on the generated pieces of summary information in order to generate fault event questions, and by deriving a response based on material acquired for generating the first action with respect to the fault event questions.

2. The system of claim 1, wherein the actions stored in the second storage unit result from execution of an automatic execution script or an automatic patch program.

3. The system of claim 1, wherein the actions stored in the second storage unit result from execution of an automatic execution script or an automatic patch program.

4. The system of claim 1, wherein the second action is taken against the detected fault event in order to improve a reliability of the data center.

5. A method of fault event management performed by a system for automatically managing a fault event of a data center, the fault event management method comprising:

analyzing a piece of fault event related material;

generating pieces of summary information about the piece of fault event related material;

generating a response corresponding to a first fault event of a type according to an analysis of an association between the generated pieces of summary information;

storing a fault event pattern generated by associating the first fault event of a type with the response;

checking statuses of servers to detect occurrence of a second fault event, and if the second fault event occurs, determining whether an automated action is possible;

searching for and extracting information related to the second fault event, in the case that the second fault event is determined difficult to be resolved by a first action stored in a second storage unit, which is configured to store actions taken and verified with respect to the first fault event that has occurred, from an information accumulated in a first storage unit, and generating and outputting a group of automated action candidates for the second fault event determined to be difficult to resolve; and automatically taking a second action against a fault event that has occurred, by use of the first action accumulated in the second storage unit, wherein the analysis of the piece of fault event related material comprises:

extracting a fault event keyword and a fault event sentence with respect to raw data by performing the analysis comprising a morpheme analysis and a synonym analysis with respect to the raw data, and generating the pieces of summary information based on the extracted fault event keyword and sentence; and generating the fault event pattern by performing a keyword syntactic analysis on the generated pieces of summary information to generate fault event questions, and by deriving a response based on material acquired for generating the first action with respect to the fault event questions.

6. The method of claim 5, wherein the actions stored in the second storage unit result from execution of an automatic execution script or an automatic patch program.

7. The method of claim 5, wherein the actions stored in the second storage unit result from execution of an automatic execution script or an automatic patch program.

8. A non-transitory computer-readable recording medium storing a program configured to instruct a computer to execute the method of claim 5.

9. The method of claim 5, wherein the second action is taken against the fault event in order to improve a reliability of the data center.

* * * * *